Patented July 10, 1951

2,559,794

UNITED STATES PATENT OFFICE 2,559,794

CASTING SOLUTION OF CELLULOSE PROPIONATE

John H. Prichard, Springfield, N. J., assignor to Celanese Corporation of America, a corporation of Delaware No Drawing. Application October 30, 1946, Serial No. 706,812

2 Claims. (Cl. 106—187)

This invention relates to cellulose ester compositions and relates more particularly to cellulose propionate compositions adapted to be employed in the production of films, foils and the like by casting operations.

Materials having a basis of cellulose propionate possess a combination of physical characteristics which makes them quite valuable for many commercial applications. Among the properties which make cellulose propionate materials so outstanding are their excellent dimensional stability and moisture-resistance as well as their flexibility under stress. These properties are particularly valuable in the case of films and foils since, in many technical applications, a combination of dimensional stability, low moisture absorption and flexibility in such articles is absolutely essential.

However, the production on a commercial scale of films and foils having a basis of cellulose propionate in which the inherently advantageous properties of cellulose propionate are entirely realized has heretofore not been entirely successful. While cellulose propionate is soluble in a number of organic solvents such as acetone to form freely flowing dopes or solutions, mere solubility is found to be no indication that the films obtained by casting such dopes or solutions will be free from brittleness or otherwise satisfactory. Also, the fact that certain plasticizing compounds are compatible with cellulose propionate gives no assurance that films and foils in which said plasticizers are incorporated will possess the desired physical properties. The problem is further complicated by the fact that the solubility of the cellulose propionate is also a function of the number of free hydroxyl groups which are present in the cellulose propionate molecule.

It is, accordingly, an important object of this invention to provide improved casting solutions comprising cellulose propionate dissolved in a mixture of volatile organic solvents, which yield cellulose propionate films and foils which are dimensionally stable and moisture resistant, which are free from brittleness, and which possess good elongation and fold strength.

Another object of this invention is the provision of solutions of cellulose propionate adapted to be employed for the production of films and foils by casting operations wherein the solvent employed comprises a binary solvent mixture whose components are easily recovered and separated by the usual solvent recovery methods.

Other objects of this invention will appear from the following detailed description.

In accordance with my invention, improved films and foils having a basis of cellulose propionate may be obtained by casting operations if the volatile solvent employed to dissolve the cellulose propionate in forming the casting solution comprises a binary solvent mixture, where one of said solvents is an aromatic hydrocarbon, such as benzol or toluol, and the other an aliphatic ketone, such as acetone or methyl ethyl ketone, and the cellulose propionate employed as the film-forming material has from 0.0 to about 0.3 free hydroxyl groups therein for each glucose unit. Thus, films and foils ranging in thickness from 0.010 inch down to 0.00075 inch of excellent physical properties may be obtained by employing a casting solution wherein the cellulose propionate employed has from 0.0 to 0.1 free hydroxyl groups and the binary solvent mixture comprises from 10 to 40% by weight of acetone and from 90 to 60% by weight of benzol. Optimum results are obtained, however, in the case of cellulose propionate having 0.0 to 0.1 free hydroxyl groups when a solvent mixture containing 25% by weight of acetone and 75% by weight of benzol is employed. Where cellulose propionate containing about 0.3 free hydroxyl groups is employed as the film-forming component, the binary solvent mixture may contain up to 50% by weight of acetone with the remainder being benzol. Most advantageously, a binary solvent mixture containing 25% by weight of acetone and 75% by weight of benzol is employed as the solvent for cellulose propionate having 0.3 free hydroxyl groups.

Where ethyl methyl ketone is the aliphatic ketone employed in forming the binary solvent mixture for casting films and foils of cellulose propionate of 0.0 to 0.1 free hydroxyl groups and the aromatic hydrocarbon employed is toluol, a mixture containing from 50 to 65% by weight of ethyl methyl ketone and 50 to 35% by weight of toluol yields a dope from which excellent films and foils may be cast. Mixtures of acetone and toluol containing about 70% by weight of acetone and 30% by weight of toluol also yield excellent films with cellulose propionates of 0.0 to 0.1 free hydroxyl groups. The proportions in which the aliphatic ketone and aromatic hydrocarbon are present in the binary solvent mixtures are quite critical and any appreciable departure from these proportions with cellulose propionate of 0.0 to 0.3 free hydroxyl groups yields cellulose propionate films and foils having numerous undesirable physical characteristics such as brittleness, and the like.

In addition to the improved flexibility which characterizes the cellulose propionate films and foils prepared by my novel process, in which the full potentialities of said cellulose propionate as a film-forming material are realized by the use of specific binary solvent mixtures, an added degree of flexibility may be achieved, if necessary or desirable for certain uses, by incorporating a suitable plasticizer in the casting solution from which said cellulose propionate films and foils are prepared. Plasticizers such as, for example, dioctyl sebacate, dioctyl phthalate, dibutyl phthalate, esters of phosphoric acid, such as triphenyl phosphate, tricresyl phosphate, or trioctyl phosphate and hydrogenated terphenyls obtained by the partial catalytic hydrogenation of the terphenyls obtained by the pyrolysis of benzene may be satisfactorily employed. The plasticizer may be incorporated in the casting solution in amounts up to about 30 parts by weight for each 100 parts by weight of the cellulose propionate present therein depending on the degree of flexibility desired. Frequently, it is very desirable to incorporate in the casting solution certain stabilizing agents which act to protect the films and foils obtained therefrom from the deleterious effect of ultraviolet rays when said films and foils are exposed to sunlight or from the harmful effects of exposure to elevated temperatures for any substantial period of time. Stabilizers such as phenyl salicylate, calcium lactate, magnesium acetate, quinine bisulfate, benzalacetophenone, fluoranthene, unstable organic sulfones, such as, $\alpha$-butylene sulfone or organic esters of sulfurous acid, such as di-butyl sulfite, di-propyl sulfite, di-decyl sulfite, di-butyl "Carbitol" sulfite, diethylene glycol sulfite or dioctadecyl sulfite may be incorporated in the casting solution in amounts of from 0.01 to 3 by weight of the cellulose propionate. Other agents may also be incorporated in the casting solution, such as stearic acid, etc. to render stripping easier, anti-tackiness agents such as aluminum hydroxide as well as agents to reduce static such as the dioctyl ester of the sodium salt of sulfosuccinic acid. Effect materials such as dyes, pigments or nacreous substances may also be added for decorative purposes.

The casting solutions may contain varying concentrations of cellulose propionate depending upon the intrinsic viscosity of the cellulose propionate employed, which may be from 20 to 250 centipoises, and the thickness of the film being cast from said solution. Usually the casting solution may contain from 15 to 35% by weight of the cellulose propionate. Optimum results are obtained employing casting solutions containing from 25 to 30% by weight of cellulose propionate having a viscosity of 60 to 100 centipoises. The viscosity is determined employing a solution containing 3 grams of dry cellulose propionate in 50 cc. of an aqueous acetone solution containing 98% by weight of acetone and 2% by weight of water.

The novel cellulose propionate casting solutions prepared in accordance with my process may be cast to form films and foils while at a temperature of from 75° to 150° F. with the casting surface upon which the casting solution is flowed being at a temperature of 50° to 120° F. The casting is most conveniently effected in a continuous manner. The casting solution is flowed on to the casting surface in a suitable manner where it is shaped and set. When the major portion of the volatile binary solvent has evaporated therefrom, the film or foil formed thereon is stripped from the casting surface, seasoned for about 10 minutes to 3 hours at 140 to 200° F. to ensure removal of all of the volatile solvents and may then be wound up in roll form from which sheets of any size may be cut. The volatile solvents are recovered by means of a suitable solvent recovery system in the manner well-known in the art.

In order further to illustrate my invention, but without being limited thereto, the following examples are given:

Example I 100 parts by weight of cellulose propionate having 0.04 free hydroxyl groups and viscosity of 100 centipoises are dissolved in 300 parts by weight of a mixture comprising 75% by weight of benzol and 25% by weight of acetone and 5 parts by weight of tricresyl phosphate are added thereto as a plasticizer. The casting solution thus obtained is then filtered and cast on to the surface of a rotating film wheel, of about 12 feet in diameter the periphery of which moves at a rate of about 80 feet per hour, so as to form films about 0.01 inch in thickness and 40 inches wide. The casting solution is at a temperature of 120° F. and the surface of the film wheel at a temperature of about 90° F. during the casting operation. The volatilized benzol and acetone solvent vapors are withdrawn into a solvent recovery system. The continuous film formed on the surface of the film wheel is found to strip very easily therefrom and, after removal, is seasoned for from 2 to 2.5 hours at 160° F. to effect a substantially complete evaporation of the volatile solvent. The resulting film is clear and transparent and free from blush. The film has an average yield point taken both lengthwise and crosswise of 4.8 kg./mm.$^2$, an average break point of 5.8 kg./mm.$^2$, an elongation of 49% and a tensile product of 284. The tensile product is the product of the break point multiplied by the elongation. The film has an average variation in dimension of only 0.22% when exposed for 72 hours to an atmosphere of 0% relative humidity and then to an atmosphere of 90% relative humidity for the same period, and a moisture absorption of only 1.5% under said conditions. The film remains absolutely flat with no curvature whatever developing on being subjected to the Remington Rand test. The Remington Rand test is performed by cutting a strip one inch wide and suspending it at 100% relative humidity at a temperature of 140° F. The radius of curvature is observed from one to ten days and if the radius of curvature exceeds 10 inches the film is considered flat. The film rates 18 on the Shopper fold test.

Example II 100 parts by weight of cellulose propionate having 0.29 free hydroxyl groups therein and a viscosity of 122 centipoises are dissolved in 300 parts by weight of a mixture comprising 50% by weight of acetone and 50% by weight of benzol and then 5 parts by weight of di-octyl phthalate added thereto as a plasticizer. The casting solution or dope obtained is mixed thoroughly, filtered and then cast on to the surface of a rotating film wheel to form continuous films, the periphery of the wheel moving at a rate of 250 feet per hour. The casting solution is maintained at a temperature of 85° F. and the surface of the film wheel at 80° F. The continuous film formed is 0.005 inch thick and strips easily from the wheel surface. The film is seasoned at 155° F. for one hour to ensure substantially complete removal of the volatile solvent. The seasoned film is clear and transparent with no blushing apparent. The film has an average yield point taken along the length and across the width of 4.7 kg./mm.$^2$ and an average break point of 5.5 kg./mm.$^2$. The elongation is 43% and the tensile product 236. The film has an average dimensional change of 0.31% and a moisture regain of 2.2% when exposed to 0% relative humidity for 72 hours and then exposed to an atmosphere of 90% relative humidity for 3 days. No curvature develops after 8 days' exposure to the Remington Rand test.

*Example III*

100 parts by weight of cellulose propionate having zero free hydroxyl groups and a viscosity of 63 centipoises are dissolved in 320 parts by weight of a solvent mixture comprising equal parts by weight of ethyl methyl ketone and toluol, and 7.5 parts by weight of tricresyl phosphate are added thereto as a plasticizer. The resulting dope is cast at a temperature of 120° F. on to a rotating casting surface which is at a temperature of 80° F. and moves at a rate of 75 feet per hour. A continuous film 0.010 inch in thickness is formed on evaporation of the solvent mixture, the volatized solvent vapors being recovered in a suitable solvent recovery system. The film obtained is clear, flexible and transparent, having an average break point of 4.2 taken in the length and width, an elongation of 39% and a tensile product of 164. The film exhibits excellent dimensional stability and undergoes a dimensional change of only .25% when exposed to 0% humidity for 72 hours and then 90% humidity for 72 hours. The film has a moisture regain of about 1.7% under these conditions.

The cellulose propionates having 0.0 to 0.3 free hydroxyl groups per glucose unit and employed in the preparation of films and foils in accordance with my novel process may be obtained by treating cellulose with an esterifying medium comprising propionic acid, propionic anhydride and a suitable esterification catalyst, such as sulfuric acid. The esterification may be effected either with or without a pretreatment of the cellulose designed to render the same more reactive and more readily esterifiable when treated with the esterification mixture. The cellulose is entered into the esterification medium, and, after the esterification reaction is completed, the fully esterified cellulose propionate produced by said reaction is obtained in the form of a viscous, homogeneous solution. Water is added to this solution to convert any unreacted propionic anhydride remaining to propionic acid. Water or other non-solvent for the fully esterified cellulose propionate may then be added in a sufficient quantity to precipitate the cellulose propionate thus yielding a precipitated cellulose tripropionate having 0.0 free hydroxyl groups. Where a hydrolyzed cellulose propionate having up to 0.3 free hydroxyl groups is desired, an amount of water sufficient for ripening is added and the fully esterified cellulose propionate in solution is permitted to ripen whereby propionyl groups are hydrolyzed therefrom to form a cellulose propionate having the desired hydroxyl value, namely, up to 0.3 free hydroxyl groups. The hydrolyzed cellulose propionate may then be precipitated from solution by the addition of an excess of water or other non-solvent thereto. The cellulose propionates of 0.0 to 0.3 free hydroxyl groups which I employ are characterized by their complete or substantially complete solubility in butyl acetate, in ethyl acetate and in isopropyl acetate. The films and foils may be blown, formed, printed, laminated, pleated, embossed and substrated with gelatin. The excellent flatness and highly polished appearance renders the film suitable for making sound discs. The foil can be used for wrapping, or packaging purposes, or for the preservation of documents, newspapers etc. by lamination. The cellulose propionate dope may also be used for coating foraminous materials such as wire cloth, open mesh fabric etc.

It is to be understood that the foregoing detailed description is given merely by way of illustration and that many variations may be made therein without departing from the spirit of my invention.

Having described my invention, what I desire to secure by Letters Patent is:

1. A casting solution comprising cellulose propionate having from 0.0 to 0.1 free hydroxyl groups per glucose unit therein dissolved in a volatile binary solvent mixture containing 10 to 40% by weight of acetone and 90 to 60% by weight of benzol.

2. A casting solution comprising cellulose propionate having from 0.0 to 0.1 free hydroxyl groups per glucose unit therein dissolved in a volatile binary solvent mixture containing about 75% by weight of benzol and about 25% by weight of acetone.

JOHN H. PRICHARD.

REFERENCES CITED

The following references are of record in the file of this patent:

UNITED STATES PATENTS

| Number | Name | Date |
| --- | --- | --- |
| 1,818,108 | Theumann | Aug. 11, 1931 |
| 1,842,640 | Zimmerli | Jan. 26, 1932 |
| 1,920,212 | Payne | Aug. 1, 1933 |
| 1,963,765 | Stevens | June 19, 1934 |
| 2,100,425 | Bent et al. | Nov. 30, 1937 |
| 2,148,381 | Slauter | Feb. 21, 1939 |
| 2,167,909 | Rooney | Aug. 1, 1939 |
| 2,259,746 | Goff | Oct. 21, 1941 |
| 2,319,051 | Fordyce et al. | May 11, 1943 |

OTHER REFERENCES

"Cellulose and Derivatives," High Polymers, vol. V, (1943), Ott, pages 687 and 688.

Wiggam et al.: "Journal-Ind. and Eng. Chem.," 26, 553, (1943).